April 9, 1946.  J. F. MORSE  2,398,243
TRANSMISSION CONTROL FOR MARINE ENGINES
Filed May 7, 1945   2 Sheets-Sheet 2
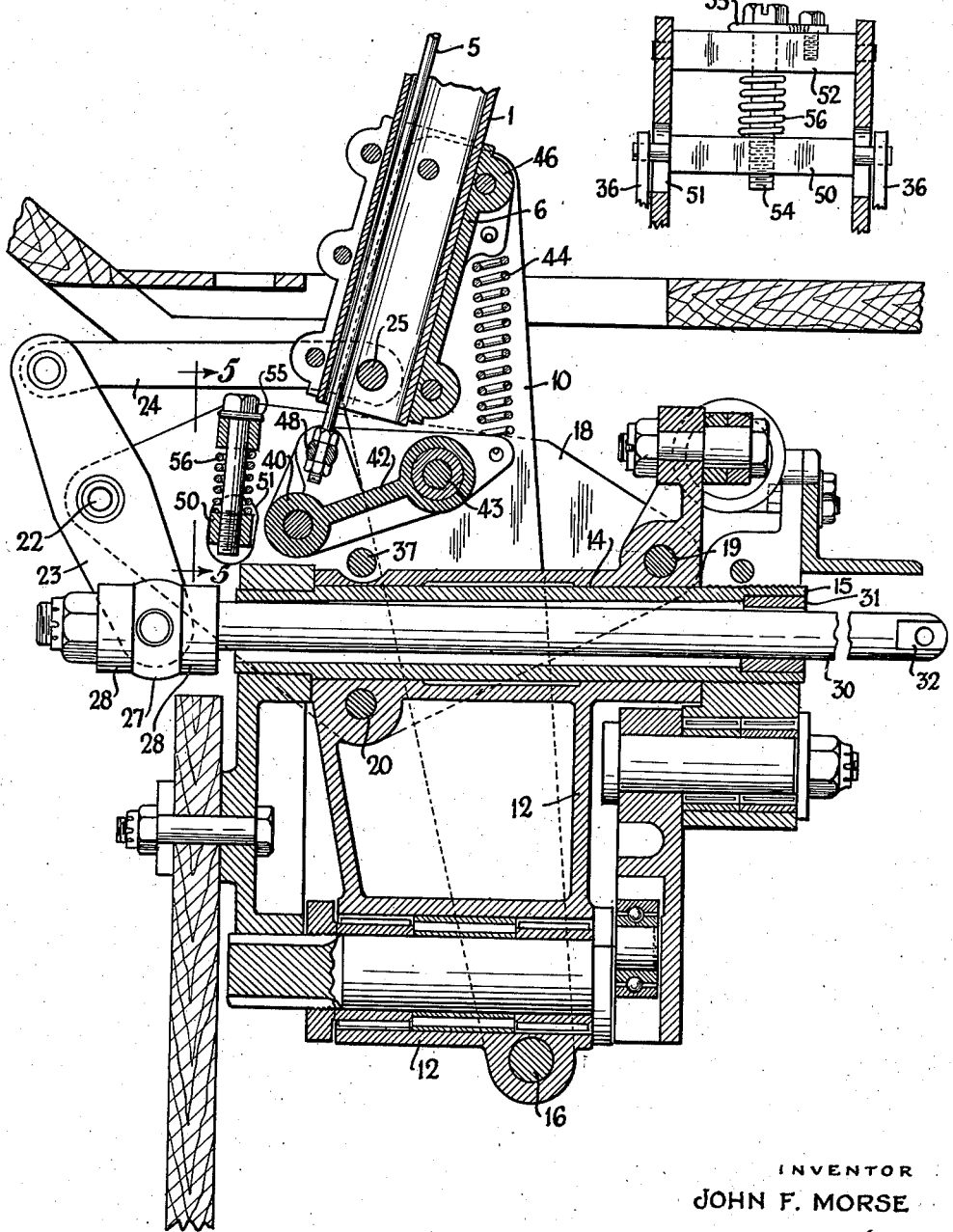
INVENTOR
JOHN F. MORSE
BY
ATTORNEYS Patented Apr. 9, 1946

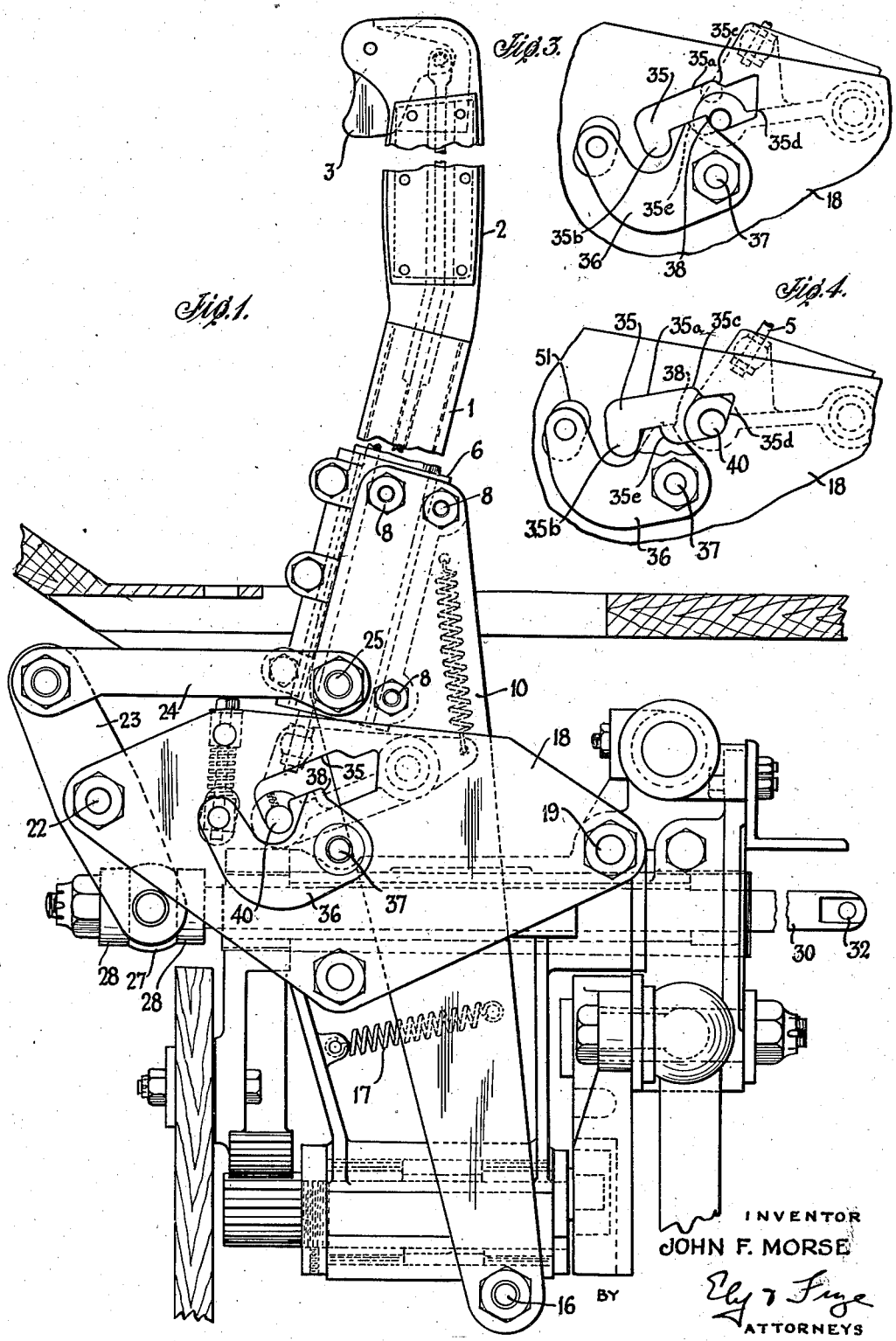

2,398,243

UNITED STATES PATENT OFFICE 2,398,243

TRANSMISSION CONTROL FOR MARINE ENGINES

John F. Morse, Hudson, Ohio

Application May 7, 1945, Serial No. 592,494

8 Claims. (Cl. 74—473)

The present invention relates to control devices, particularly adapted and intended for shifting the gears in transmissions for marine engines, although the invention may be applied to any type of transmission. The invention is illustrated as adapted for and applied to a control stick of the type shown and described in my former Patent No. 2,321,098, dated June 8, 1943, in which a single control stick is mounted so that by its pivotal movement the transmission is shifted and by rocking movement in a plane at right angles to the pivotal movement the rudder is operated. The specific form of stick mounting which is illustrated herein also provides for a variable ratio between the rocking movement of the lever and the angular deflection of the rudder, but that mechanism is covered in prior applications, particularly in application Serial No. 587,887, filed April 12, 1945, to which reference may be made.

Referring to the objects and purposes of the present invention, the mechanism herein disclosed is designed to supply certain deficiencies in standard transmission shifting devices used on power-operated craft. It provides a simple and effective arrangement for compensating for wear or differences in adjustment of a transmission which make it difficult at times for the operator to find the neutral point and to hold the transmission at that point.

Marine transmissions are especially apt to vary with respect to the location of the neutral point. Shifting of the neutral point may be due to maladjustment, but more frequently is due to the excessive wear of the parts. It is one purpose of this invention to provide means by which the transmission-controlling device may be adjusted for variations in the neutral point.

A further purpose of the invention is to provide means to make a quick adjustment in case the neutral point on the transmission develops a tendency to creep to one side or the other. Heretofore it has been necessary in such cases to tear down the transmission and make the adjustments therein to bring the transmission in conformity with the stick or lever. The present invention provides for making adjustments at the lever itself.

In the drawings there is illustrated the best known and preferred form of the invention incorporated with the features of stick control for power boats which are the subject of my previous patents and applications. However, this invention is not limited to incorporation or association with these other inventions. Also, it will be understood and appreciated that the details of construction shown herein may be altered or improved upon without departing from the principles of the invention as set forth in the appended claims.

In the drawings:

Fig. 1 is a side elevation of a control stick of the preferred type having the present invention incorporated therein. In this view the stick is in forward position. This view necessarily shows many of the elements of my other inventions relating to the dual function of the stick as both a transmission controlling device and a steering mechanism.

Fig. 2 is a vertical section.

Fig. 3 is a fragmentary view of the neutral finding device showing the position of the parts when the stick is in neutral.

Fig. 4 is a similar view showing the parts in reverse.

Fig. 5 is a section on the line 5—5 of Fig. 2.

In describing the features of the present invention it will be necessary to enter into a description of certain elements which are not directly connected with the invention and it will be understood that such description is not to be taken as limiting the application of the invention to association with these other features. An essential element of the present invention is the means for shifting the location of the stop or detent which locates the neutral point in the arc of lever or stick movement. This makes it possible for the operator not only to locate the neutral point more readily, but to hold the lever in that neutral point whatever may be the condition of the transmission. Another feature is the provision of means readily accessible to the operator by which the location of the detent may be shifted to accommodate a change in the neutral point of the transmission.

The main portion of the stick which is illustrated herein is a tube 1, the upper end of which is provided with a handle or grip 2 in which the trigger 3 is pivoted. The trigger is connected to and moves the rod 5 which extends through the tube and by which the operator raises the catch or lock by which the stick is held in its various positions.

The lower end of the tube is received and clamped in a split sleeve 6. To opposite sides of this sleeve are attached by bolts 8, two long arms 10 which extend downwardly in the cradle.

The cradle is indicated as a whole by the numeral 12 and will not be described in detail, it being sufficient to state that it is provided with a fore-and-aft bearing 14 which is received over a stationary tubular shaft 15 secured beneath the deck of the cabin. This mounting provides the rocking movement by which the rudder is operated. The arms 10 extend on either side of the cradle and are pivoted at their lower ends on the transverse shaft or bolt 16 at the base of the cradle. This provides the pivotal movement for the stick by which the transmission is shifted. Spring means such as the coil spring 17, connected at its ends to an arm 10 and to the cradle 12, yieldingly holds the stick in neutral position.

On opposite sides of the cradle and spanning the arms 10 are located two main or detent plates 18 which are somewhat rhomboidal in form. These plates are secured to the cradle by transverse bolts 19 and 20. At the forward extremity of the plates 18 is a transverse bolt 22 on which are pivoted two parallel rocking arms 23, the upper ends of which are connected to two parallel links 24. The rear ends of the links 24 are received over a pin 25 which passes through the base of the tube 1 and the arms 10. The lower ends of the arms 23 are connected to a rotating collar 27 which is held between two thrust bearings 28 on the forward end of a rod 30. The rod 30 is the transmission-shifting rod and is located within and extends through the tubular shaft 15. The rear end of the rod 30 is connected at 32 to the transmission by any suitable linkage, none of these latter parts being shown as they may be of any suitable or desirable type and form no part of the present invention.

Cut in the plates 18 are the irregular angular slots or grooves, designated in their entirety as 35. Each slot is formed with a main angular reach or portion 35$^a$ which terminates at its forward end in a recess 35$^b$, which corresponds to the forward location of the stick, as shown in Fig. 1. At the rear, the slot is formed with a shoulder 35$^c$ which leads to an offset bay 35$^d$ which corresponds to the reverse position of the stick. The neutral position, lying between 35$^b$ and 35$^d$, is adjustable but the maximum advanced position of the stick in neutral is represented by the shoulder 35$^e$ in the lower wall of the slot opposite the point 35$^c$. Except in an extreme case, the actual operating neutral point is adjustably controlled by a pair of pivoted secondary or cam plates 36 which, as shown, are approximately C-shaped so as to clear the recesses 35$^b$. Each cam plate is pivoted on a side plate 18 on the pin 37 which is adjacent the point 35$^e$. The plate 36 has a shoulder 38 which overlies the point 35$^e$, the rear face of the shoulder forming a stop for the actual neutral point. It will be seen, therefore, that by shifting the cam plates about the point 37, the location of the neutral point on the stick may be adjusted to bring it into conformity with the true neutral point in the transmission, and to compensate for changes in the true neutral point as wear or other causes may alter the location thereof.

A transverse pin 40, usually of hardened steel, extends across the plates 18, the ends of the pin riding in the slots 35. The central portion of the pin is fixed in the forward end of a rocking latch member 42 which is pivoted on a pin 43 mounted in the arms 10. A coil spring 44, extending from the rear end of the latch 42 to a lug 46 on the sleeve 6, yieldingly holds the pin 40 against the lower side of the slots 35. At its forward end the latch 42 is connected by a knuckle joint 48 to the lower end of the trigger rod 5.

Assuming that the control stick is in the forward position, the operator raises the pin 40 through the trigger 3 and trigger rod 5 and may then move the stick to place the transmission in neutral or reverse. If neutral position is desired, the operator can feel the pin 40, which is riding on the upper surfaces of the slots 35, strike the shoulders 35$^c$ as shown in dotted lines in Fig. 3. He may then release the trigger and the pin will come to rest behind the shoulders 38 where, if the cam plates 36 are properly adjusted, the transmission will hold due to the force of the spring 17 or to an equivalent means at any other point in the transmission system. If reverse is desired, he may force the pin over the surfaces 35$^c$ in going from forward or may draw the pin in the bay 35$^d$ in going from neutral.

The adjustment of the neutral point represented by the shoulder 38 is accomplished by the angular adjustment of the pivoted cam plates 36. The free ends of these plates are pivotally connected to the rounded ends of a bar 50 which passes through slots 51 formed in the plates 18. Above the bar 50 extends a second transverse bar 52 pivotally mounted in the plates 18. An adjusting screw 54 is threaded at its lower end in the bar 50. The upper end of the screw rests against the upper surface of the bar 52 where a spring lock 55 is provided to hold the screw from rotating. An expansion spring 56 is interposed between the bars 50 and 52. By rotating the screw the cam plates 36 may be rocked about their pivot points to shift the location of the shoulders 38 and bring the neutral point for the control stick into exact conformity with the actual neutral point in the transmission. During the operation of the boat, if it is found that the stick is not holding at the neutral point, the operator may correct this condition by turning the screw 54 until the correct neutral point is found.

It will be seen that a very simple and efficient mechanism has been provided by which the difficulties in holding a transmission in neutral are avoided, and by which the setting of the neutral point in the lever is adjusted to conform to changes in the actual neutral point.

The mechanism shown herein rectifies a condition which has heretofore given considerable trouble in the operation of power craft.

What is claimed is:

1. A transmission control device comprising a movable lever, connections from the lever to the transmission, a latch on the lever, a detent plate adjacent the lever, and a formation on the plate engaged by the latch when the lever is in neutral position, said formation being adjustable to conform to variations in the neutral position of the transmission.

2. A transmission control device comprising a pivoted lever, connections from the lever to the transmission, a latch on the lever, a detent plate adjacent the lever, a groove in the plate, said groove having a recess at one end engaged by the latch when the lever is in forward position, a second plate overlying the central portion of the groove and having a shoulder engaged by the latch when the lever is in neutral position, and means for shifting the second plate to change the location of the neutral point.

3. A transmission control device comprising a pivoted lever, connections from the lever to the transmission, a latch on the lever, a detent plate adjacent the lever, a groove in the plate, said groove having a recess at one end engaged by the latch when the lever is in forward position, a second plate pivoted on the detent plate, said second plate having a shoulder which projects into the groove and is engaged by the latch when the lever is in neutral position, and means to rock the plate for shifting the location of the shoulder.

4. A transmission control device comprising a pivoted lever, connections from the lever to the transmission, a latch on the lever, a detent plate adjacent the lever, a formation on the plate engaged by the latch when the lever is in neutral position, and means accessible to the operator for shifting the location of the formation to bring the formation into register with the neutral position of the transmission.

5. A transmission control device comprising a movable lever, connections from the lever to the transmission, a latch on the lever, a detent plate adjacent the lever, a groove on the detent plate, said groove having a recess to receive the latch when the lever is in forward position, a secondary plate beside the detent plate and having a shoulder projecting over the groove to provide a stop for the lever when in neutral position, and means accessible to the operator for shifting the secondary plate.

6. A transmission control device comprising a pivoted lever, connections from the stick to the transmission, a latch on the lever, a detent plate at the side of the lever, said plate having a slot therein, one end of the slot being provided with a recess to receive the latch when the lever is in forward position, a second plate pivoted on the detent plate and having a shoulder projecting over the slot at a midway point therein to provide a stop for the latch when the lever is in neutral position, and means connected to the second plate whereby it may be shifted about its pivot to vary the location of the shoulder.

7. A transmission control device comprising a transmission shifting rod, a pivoted stick connected to the rod, a latch on the stick, a detent plate at the side of the stick, a groove in the detent plate, said latch engaging the groove, a secondary plate mounted on the detent plate and having a projection overlying the groove between the ends thereof to provide a stop for the stick when the transmission is in neutral, and adjusting means by which the secondary plate may be shifted along the groove.

8. A transmission control device comprising a transmission shifting rod, a pivoted stick connected to the rod, a latch on the stick, a detent plate at the side of the stick, a groove in the detent plate, said latch engaging the groove, a second plate pivotally mounted in the detent plate and having a projection overlying the groove between the ends thereof to provide a shoulder against which the latch may rest when the transmission is in neutral, and adjusting means by which the secondary plate may be rocked about its pivot to shift the position of the shoulder along the groove.

JOHN F. MORSE.